Figure 1:
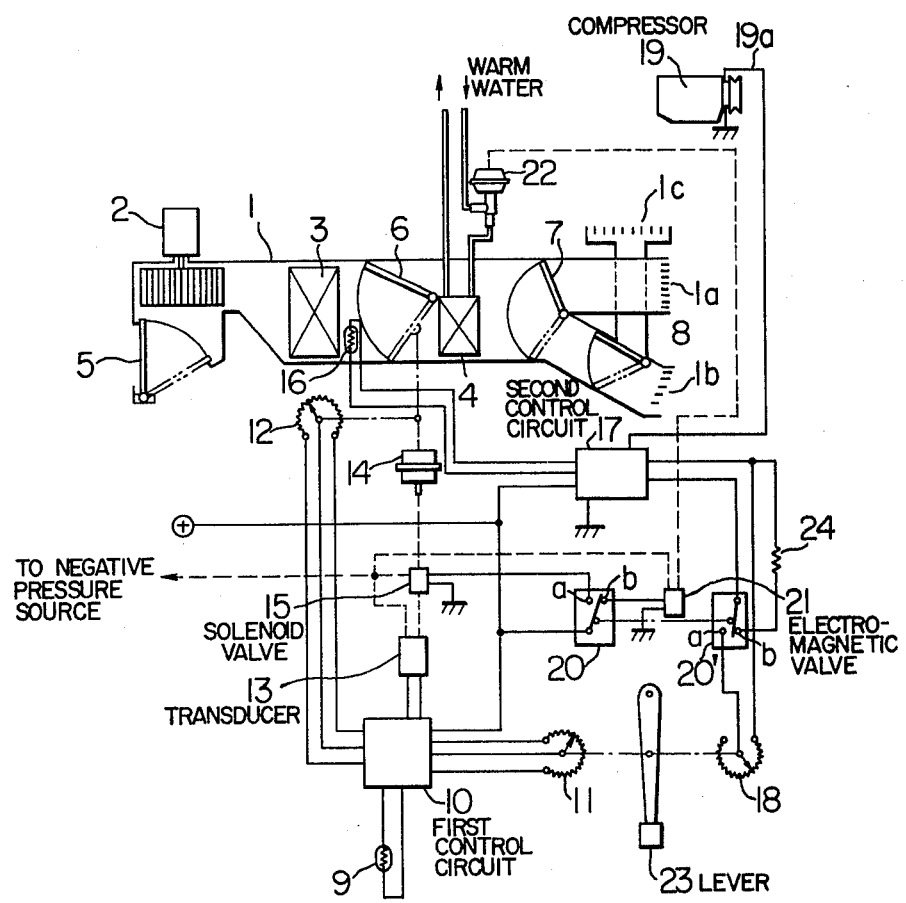

United States Patent [19]

Ito et al.

[11] Patent Number: 4,466,480
[45] Date of Patent: Aug. 21, 1984

[54] TEMPERATURE CONTROL APPARATUS FOR A MOTOR VEHICLE AIR CONDITIONER

[75] Inventors: Tosikazu Ito, Ibaraki; Kenichi Chonan, Katsuta, both of Japan

[73] Assignee: Hitachi, Ltd., Tokyo, Japan

[21] Appl. No.: 375,217

[22] Filed: May 5, 1982

[30] Foreign Application Priority Data

May 6, 1981 [JP] Japan ................. 56-66990

[51] Int. Cl.³ ............................................. F25B 29/00
[52] U.S. Cl. ....................................... 165/12; 62/226; 62/229; 62/323.4; 165/30; 165/40; 165/43
[58] Field of Search ....................... 165/12, 28, 30, 40, 165/42, 43; 62/226, 229, 244, 323.4; 237/2 A

[56] References Cited

U.S. PATENT DOCUMENTS

| | | | |
|---|---|---|---|
| 3,315,730 | 4/1967 | Weaver et al. | 165/28 |
| 3,738,120 | 6/1973 | Beatenbough | 62/229 |
| 4,143,706 | 3/1979 | Schnaibel et al. | 165/28 |
| 4,289,195 | 9/1981 | Bellot et al. | 165/12 |
| 4,323,111 | 4/1982 | Iijima | 165/28 |
| 4,324,286 | 4/1982 | Brett | 165/28 |
| 4,337,818 | 7/1982 | Franz | 165/28 |
| 4,356,705 | 11/1982 | Sutoh et al. | 62/229 |
| 4,365,663 | 12/1982 | Inoue et al. | 165/30 |
| 4,383,574 | 5/1983 | Yoshioka | 165/43 |
| 4,385,503 | 5/1983 | Okura | 165/43 |
| 4,420,033 | 12/1983 | Franz | 62/323.4 |

FOREIGN PATENT DOCUMENTS

| | | | |
|---|---|---|---|
| 2939954 | 4/1980 | Fed. Rep. of Germany | 165/43 |
| 55-1215 | 1/1980 | Japan | 165/42 |

*Primary Examiner*—Douglas Hart
*Attorney, Agent, or Firm*—Antonelli, Terry & Wands

[57] ABSTRACT

A temperature controlling apparatus is provided for use in systems such as a motor vehicle air conditioner. In the temperature controlling apparatus, a cycling clutch and a re-heated air mixing system are selectively used in accordance with the environmental condition. The cycling clutch system temperature control is effected in summer season to control an operating period of time of a compressor, and the re-heated air mixing system temperature control is effected in spring or autumn season to dehumidify the air and in winter season by means of an air mixing door after stopping the compressor thereby controlling an amount of the intake air which is to be re-heated.

11 Claims, 1 Drawing Figure

U.S. Patent     Aug. 21, 1984     4,466,480

TEMPERATURE CONTROL APPARATUS FOR A MOTOR VEHICLE AIR CONDITIONER

The present invention relates generally to a temperature control apparatus for use in a motor vehicle air conditioner, and more particularly, to a temperature control apparatus of the so-called re-heated air mixing system for use in a motor vehicle air conditioner, wherein the intake air is cooled and dehumidified through an evaporator, with a ratio of an amount of the cooled air bypassing a heater core with respect to an amount of the cooled air passing through the heater being controlled by means of an air mixing door so that only the amount of cooled air passing through the heater is re-heated by the heater, whereby the temperature of discharge air can be controlled.

In a prior-art temperature control apparatus of re-heat air mixing system for use in a motor vehicle air conditioner, since an amount of the air cooled and dehumidified which passes through a heater for heating is controlled by means of an air mixing door to thereby control a temperature of the discharge air, the heater must be actuated even in summer season for temperature control.

More specifically, the cooled and dehumidified air has a temperature of 0° C. to 10° C. In order to raise a temperature of the cooled air up to a level corresponding to a desired set temperature in the vehicle chamber, the heater must be activated to re-heat a portion of the cooled air.

This means that the compressor in the motor vehicle air conditioner must be driven additionally by an amount of energy corresponding to the energy used in re-heating the portion of the cooled air by the heater, in summer season.

Accordingly, it is an object of the present invention to minimize an operating period of time of the compressor and therefore the engine load, especially, in summer season to thereby reduce the fuel cost of a motor vehicle equipped with an air conditioner.

The feature of present invention resides in that a temperature controlling system can be switched over to either the cycling clutch system or re-heated air mixing system in accordance with operating conditions, so that the cycling clutch system temperature control is effected in summer season to control an operating period of time of the compressor, and the re-heated air mixing system temperature control is effected in spring or autumm season to dehumidify the air and in winter season by means of an air mixing damper after the compressor is stopped thereby controlling the amount of intake outdoor air which is to be re-heated.

The above and other objects and advantages of the present invention will become clear from the following description with reference to the accompanying drawing, in which:

The single FIGURE is a block diagram for illustration of a temperature control apparatus for use in a motor vehicle air conditioner in accordance with an embodiment of the present invention.

Referring to the drawing, a ventilating line 1, comprised of ducts and casings, is provided at its inlet portion with a blower or fan 2 which is driven by a motor.- The air brought into the ventilating line 1 by the blower 2 will pass through an evaporator 3 disposed within the ventilating line 1. The cooled air flowing through the evaporator 3 will be divided into two flows by an air mixing door 6, that is, an air flow through a heater core 4, and an air flow bypassing of the core 4.

On the other hand, an inlet-air switching door 5 is provided to selectively bring into the ventilating line 1 one of the above-mentioned two different flows of the air within the vehicle chamber, the air outside of the vehicle, i.e., outdoor air, and the mixture thereof.

Downstream of the heater core 4, the ventilating line 1 is branched into an outlet port, 1a, through which the air is discharged upward within the vehicle chamber, and an outlet port 1b through which the air is discharged downward within the vehicle chamber.

At the branched point between the outlet ports 1a and 1b, a diverting damper 7 is disposed to control the air diverting ratio between the outlet ports 1a and 1b.

Further, the duct connecting the diverting door 7 and the outlet port 1b has at its intermediate portion an additional ventilating duct branched to a defrosting outlet port 1c. The additional duct, in turn, is provided at its branching portion with a defrosting door 8. The air discharged from the defroster port 1c will be directed toward the windshield in front of the vehicle.

A temperature sensor 9, mounted on an instrument panel within the vehicle, will detect a typical temperature in the vehicle chamber in the form of an output voltage signal and sent it to a first control circuit 10. The first control circuit 10 will also receive an output voltage signal representative of the opening degree of the air mixing door 6 from a potentiometer 12.

The first control circuit 10 will calculate the opening or closing degree of the mixer door, 6 on the basis of its input voltage signals and control a transducer 13 according to its output voltage signal representative of the calculation result, whereby the temperature in the vehicle chamber is set at a desired set level.

When it is desired to reduce the amount of air flowing through the heater 4 to decrease the discharge air temperature, the transducer 13 will be energized so as to increase the negative pressure supplied to an actuator 14 to thereby pull the air mixing damper 6 by a set amount up to its dotted-line position.

Conversely, if it is desired to increase an amount of the air flowing through the heater 4 to raise the discharge air temperature, then the transducer 13 will be deenergized so as to increase an amount of outdoor air supplied to the actuator 14 to thereby pull the damper 6 by a set mount up to its solid-line position. A spring (not shown) provides the necessary force for returning the door to its original position.

A solenoid valve 15 disposed within a fluid passage between the transducer 13 and the actuator 14, and, when energized, the valve 15 will block the fluid supplied from the transducer 13 and apply the negative pressure from a negative pressure source directly to the actuator 14. Under this condition, the air mixing door 6 will be kept at the dotted-line position.

When deenergized, on the other hand, the solenoid valve 15 will block the negative pressure from being applied to the actuator 14 and instead supply the fluid from the transducer 13 to the actuator 14.

A temperature sensor 16 is used to detect or sense a temperature of the cooled air supplied from the evaporator 3 in the form of an output voltage signal and apply the signal to a second control circuit 17.

A rheostat 18 for temperature setting is controlled by a lever 23 to set a temperature of the cooled air from the evaporator 3. An output voltage signal from the rheostat resistor 18 is sent to the second control circuit 17.

The second control circuit 17 will function to decide as to whether a compressor 19 is driven or stopped on the basis of both the input signals from the sensor 16 and the rheostat 18, and according to the decision result, it is decided whether an electromagnetic clutch 19a is energized or deenergized, to thereby drive or stop the compressor 19 and set the evaporator 3 exit temperature at a desired set level.

For example, when it is required to lower the cooled air temperature from the evaporator 3, the electromagnetic clutch 19 will be energized to drive the compressor; whereas if it is desired to raise the cooled temperature, then the clutch will be deenergized to stop the compressor.

Ambient temperature switches 20 and 20' are interlocked to each other and both function to switch to contact "a" when the ambient temperature exceeds 25° C. and switch to contact "b" when the temperature is not higher than 25° C.

Another electromagnetic valve 21 is placed in a negative pressure passage between the negative pressure source and an actuator of a warm water valve 22. When energized, the valve 21 will apply the negative pressure to the warm-water valve actuator to open the associated valve 22. If deenergized, the valve 21 will apply the atmospheric pressure to the actuator to close the associated warm-water valve 22.

In this way, the warm-water valve 22 will control an amount of the warm water supplied to the heater core 4 through its open or close operation.

When the ambient temperature switches 20 and 20' are at the "b" contact positions, the electromagnetic valve 21 will be energized so as to open warm-water valve 24 and the second control circuit 17 will receive a voltage drop signal across a fixed resistor 24 instead of the output voltage of the rheostat 18. At this time, the second control circuit 17 and the fixed resistor 24 together form an anti-freezing circuit for the evaporator 3.

The value of the fixed resistor 24 is selected in association with the output voltage of the sensor 16 in such a manner that the second control circuit 17 generates a compressor stop signal only when the temperature of the cooled air at the evaporator outlet drops below 0° C., namely, a critical temperature of freezing of the evaporator.

With the ambient temperature switches 20 and 20' at the "a" contact positions, the electromagnetic valve 15 will be energized so as to keep the air mixing door 6 at its dotted-line position and at the same time, the electromagnetic valve 21 will be deenergized so as to close the warm water cock 22. Further, the control circuit will receive the output voltage of the rheostat resistor 18.

Therefore, if the ambient temperature rose to 25° C. or above, for example, as in the summer season, then the air mixing door 6 will be kept at the dottedline position so that the second control circuit 17 causes the compressor 19 to controllably be turned on or off, whereby the temperature of the cooled air at the evaporator 3 outlet will be adjusted to a level set by the rheostat 18 and thus the temperature of the air discharged into the vehicle chamber can be adjusted.

Since this eliminates re-heating operation by the heater 4, the operating time of the compressor 19 will be correspondingly reduced.

At the same time, the temperature control apparatus is arranged so as to stop the supply of warm water into the heater 4 in the illustrated embodiment, and thus the cooled air is prevented from being heated by the heater 4 during its passage around the heater 4.

On the other hand, when the ambient temperature drops below 25° C., for example, as in the winter season, the output signal from the first control circuit 10 will cause the opening degree of the air mixing door 6 to be controlled, whereby the discharge air temperature can be adjusted.

Although the above explanation has been made in connection with the case where switching of the switches 20 and 20' is effected according to the ambient temperature, it will be understood that the invention is not limited to the particular embodiment but covers all other possible modifications, alternatives and equivalent arrangements included in the scope of appended claims.

For example, the temperature control apparatus can be arranged so that the apparatus decides as to whether it is desired to increase or decrease the temperature in the vehicle chamber, i.e., cool demand or heat demand, and so that the ambient temperature switches 20 and 20' are moved to the "a" contact positions for the cool demand to put the apparatus under the cycling clutch system temperature control; whereas the switches 20 and 20' are moved to the "b" contact positions for the heat demand to put the apparatus under the re-heated air mixing system temperature control.

The demand deciding means may basically comprise an A/D converter for receiving both the output of the vehicle chamber temperature sensor 9 and the output of the set-temperature detecting potentiometer 11 to convert to corresponding digital signals, as well as an arithmetic unit for performing proportional/integral operations on the both digital output signals from the A/D converter under predetermined programs to calculate the corresponding cooling or heating demand amount.

In this connection, current variations in a phototransistor by solar radiation light may be converted to a voltage signal and further to a digital signal, and at the same time the output of the ambient temperature sensor may be converted to a digital signal, to thereby add both the digital signals as a correction value to the digital signal indicative of the set temperature, if desired.

The output of the arithmetic unit has a plus or minus sign. If the output has a minus sign, then the temperature control apparatus will operate as a cooling one until the cool demand amount is minimized. While, when the output has a plus sign, the apparatus will operate as a heating one until the heat demand amount is minimized.

The arithmetic unit may be replaced by the first control circuit 10. In that case, the output of the arithmetic unit will be sent, when having a plus sign, to the transducer 13 to control the air mixing door 6 according to the output amount of the transducer 13 and thus control the temperature of the discharge air. When the output of the arithmetic unit has a minus sign, on the other hand, the temperature control apparatus is arranged so that the output with a minus sign will cause a relay to be energized to switch its relay contacts into the corresponding contact positions which have the same function as those of the switches 20 and 20', thereby putting the apparatus in the above-mentioned temperature control mode of the cycling clutch system.

In lieu of the ambient temperature switches 20 and 20', such an arrangement may be employed that a thermistor is used to detect the ambient temperature, and an electronic circuit is controlled according to the output of the thermistor to actuate a relay so that contacts in the relay will be switched into proper positions corresponding to the same function as the switches 20 and 20'.

With the arrangement of the present invention a temperature control system can be switched over such that the temperature control is effected by means of turning on and off of the compressor in the summer season and effected by means of adjusting the air mixing door while the compressor is operated at a maximum rate of operation. However, since the evaporator quickly reaches a critical temperature of freezing in conditions of a low heat load, the actual rate of operation is fairly low in spring, autumn, and the winter season, whereby the fuel cost of a vehicle mounted with the air conditioner according to the present invention can be reduced without losing the dehumidifying function frequently necessary in spring or autumn season, while reducing the operating pejiod of time of the compressor in summer season.

What is claimed is:

1. A temperature control apparatus for use in a motor vehicle air conditioner, the temperature control apparatus comprising:

an evaporator means; a heater core means for re-heating air cooled by said evaporator means; a compressor means for circulating a refrigerant through said evaporator means; an air mixing means for controlling a ratio of an amount of cooled air passing through said heater core means for re-heating to an amount of cooled air bypassing said heater core means; a first temperature controlling circuit means for controlling a position of said air mixing means to maintain a temperature of a vehicle chamber at a desired level and for stopping said compressor means immediately prior to said evaporator means being frozen; and a second temperature controlling circuit means for controlling an operating period of time of said compressor means to maintain the vehicle chamber temperature at said desired level; and means for selectively switching said first and second temperature controlling circuit means in dependence upon operating conditions of said air conditioner.

2. A temperature control apparatus according to claim 1, further comprising means for stopping a heating said heater core means when said second temperature controlling circuit means is selected by said switching means.

3. A temperature control apparatus according to claim 1, wherein the operating conditions of said switching means include an outdoor temperature, said switching means being adapted for selectively switching over said first and second temperature controlling circuit means in response to an output of an outdoor temperature sensor.

4. A temperature control apparatus according to claim 1, wherein the operating conditions of said switching means include one of a first demand for cooling said vehicle chamber and a second demand for heating said vehicle chamber, said switching means being adapted for selectively switching over said first and second temperature controlling circuit means in accordance with an output having a sign produced from a decision means for deciding said first demand.

5. A temperature control apparatus according to claim 4, wherein said decision means decides as to whether a demand for said vehicle chamber is said first or second demand to thereby generate an output having a sign.

6. A temperature control apparatus according to claim 1, wherein said means for selectively switching includes a means for detecting a physical quantity representing an operating condition of the air conditioner and for producing an electric signal corresponding to the detected quantity, and a switching device operable in response to a predetermined electric signal from said detecting means.

7. A temperature control apparatus according to claim 6, wherein said first temperature controlling circuit means includes a temperature sensor means for sensing a control temperature of freezing of said evaporator means so as to enable the stopping of said compressor means in response to a predetermined output of said temperature sensor means.

8. A temperature control apparatus according to claim 7, wherein said temperature controlling circuit means is adapted to maintain the vehicle chamber at the desired level while said air mixing means is set a position at which an amount of cooled air bypassing the heater core means is a maximum.

9. A temperature control apparatus for use in a motor vehicle air conditioner, the temperature control apparatus comprising:

an evaporator means; a heater core means for re-heating air cooled by said evaporator means; a compressor means for circulating a refrigerant through said evaporator means; means for detecting an operating state of said evaporator means; means for generating a reference signal corresponding to a state of said evaporator means immediately before said evaporator means is frozen; a first temperature controlling circuit means for comparing an output signal of said detecting means with said reference signal to thereby stop an operation of said compressor means immediately before said evaporator means is frozen; air mixing means for controlling a ratio of an amount of cooled air passing through said heater core means for re-heating to an amount of cooled air bypassing said heater core means; a position of said air mixing means being controlled to maintain a temperature of a vehicle chamber at a desired level; a second temperature controlling circuit means for controlling an operating time of said compressor means; means for fixing said air mixing damper at such a position that an amount of the cooled air bypassing said heater core means becomes maximum; means for selectively switching said first and second temperature controlling circuit means in accordance with operating conditions of the air conditioner; an adjustment means for relatively changing comparison levels of the reference signal and the output signal of said detecting means in said first temperature controlling circuit means to thereby stop the operation of said compressor means at a time point appropriately earlier than immediately before when said evaporator means is frozen, said comparison levels being adjusted to control the operating period of said compressor means to thereby maintain the vehicle chamber temperature at a desired level.

10. A temperature control apparatus according to claim 9, wherein said means for selectively switching includes a means for detecting a physical quantity representing an operating condition of the air conditioner and for producing an electric signal corresponding to the detected quantity, and a switching device operable in response to a predetermined electric signal from said detecting means.

11. A temperature control apparatus according to claim 10, wherein said first temperature controlling circuit means includes a temperature sensor means for sensing a critical temperature of freezing of said evaporator means so as to enable the stopping of said compressor means in response to a predetermined output of said temperature sensor means.

* * * * *